Aug. 1, 1933.     W. E. BOCKMON     1,920,459

METHOD OF MAKING A CERAMIC CONTAINER

Filed July 31, 1931

Inventor
Watson E. Bockmon
By Lyon & Lyon
Attorneys

Patented Aug. 1, 1933

1,920,459

UNITED STATES PATENT OFFICE 1,920,459

METHOD OF MAKING A CERAMIC CONTAINER

Watson E. Bockmon, Los Angeles, Calif.

Application July 31, 1931. Serial No. 554,209

2 Claims. (Cl. 25—156)

This invention relates to moisture retaining receptacles such as bowls, flower pots, jardinieres, and the like, which are particularly effective for the purpose for which such receptacles are employed.

The invention also relates to a method of making receptacles of this general character in such manner that their walls retain moisture for appreciable lengths of time.

For purposes of lucidity the invention will be described as it relates particularly to flower pots. Flower pots are burned clay products, the body of the pot being porous. Ordinarily, flower pots, bowls, and other receptacles adapted to receive earth and plants, are provided with walls of uniform thickness. It has been found that when a flower pot having uniformly thick walls and containing a growing plant, has water placed therein, such water is partially absorbed by the walls of the pot and the moisture thus absorbed by the walls then quickly drains along the capillaries to the bottom of the pot, thereby necessitating rather frequent waterings in order to maintain the plant or the earth in the pot in a moist condition.

This invention relates to a method of making flower pots in such manner that moisture is retained in the walls of the pot for appreciably longer periods of time, thereby permitting the moisture to be gradually given up to the earth in the pot and maintaining the pot moist for prolonged periods of time.

An object of this invention is to disclose and provide a method of manufacturing flower pots, bowls, jardiniers, and other receptacles adapted to receive plants, earth, etc., and maintain their walls in a moist condition.

Another object of this invention is to disclose and provide a method of forming the walls of flower pots and other receptacles whereby moisture may be retained in such walls for prolonged periods of time.

An object of this invention is to disclose and provide a ceramic body whose walls are adapted to receive and retain moisture.

Another object is to disclose and provide a burner clay receptacle provided with walls adapted to receive and retain moisture, said walls being designed so as to prevent or retard the flow of water within such walls in a downward direction.

These and other objects, uses and advantages of this invention will become apparent to those skilled in the art from the following detailed description of one preferred form of the invention. Reference will be had to the appended drawing in which Fig. 1 is a side elevation of a flower pot made in acordance with this invention.

Figure 2:
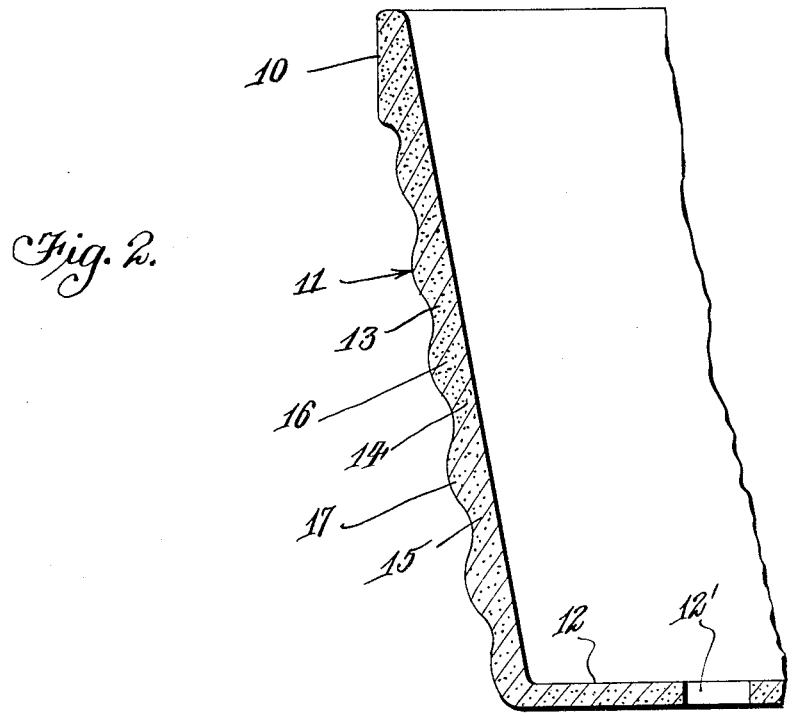

Fig. 2 is an enlarged vertical section through a portion of the wall of said flower pot.

Although for purposes of illustration the invention will be described as it pertains to the manufacture of flower pots, it is to be understood that numerous other forms of ceramic articles may be made in accordance with this invention, such as, for example, fern bowls, jardinieres, etc.

Figure 1:
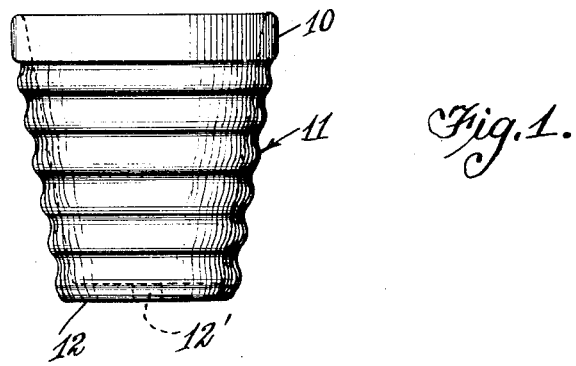

As shown in Fig. 1, when the invention is to be applied to the manufacture of flower pots, such flower pots may be in the form of a truncated cone and be provided with a substantially cylindrical flange or rim portion 10 and a conical body portion 11. The base 12 may be provided with a drainage aperture or apertures 12'. Flower pots, bowls, and the like may be made of any suitable clay or mixtures of clay, and molded either by hand or by means of machines well known in the art. Such molded clay bodies are generally dried and then burned to a temperature of from about 1200° F. to 1900° F., depending upon the character of the clay employed, the type and size of kiln and the porosity desired in the final product. Occasionally it may be advisable to introduce a small quantity of very finely divided combustible material with the clay so as to slightly increase the porosity of the resulting product by the combustion of such added combustible material.

Normally the exterior walls or interior surfaces of flower pots and the like are smooth. For example, the body portion 11 of a normal flower pot consists of substantially parallel surfaces, the wall 11 being of uniform thickness from the top to the bottom. In such normal type of flower pot, moisture is absorbed by the walls 11 as well as the upper flange or rim 10 and the base 12 and such moisture then drains downwardly through the intercommunicating porosities of the wall 11 from the rim 10 to the base 12.

As has been stated hereinbefore, this invention is particularly directed toward a method of so treating the walls of ceramic articles such as flower pots, as to prevent or at least materially retard this downward capillary flow of water in the walls of the device.

It has been found that if during the molding operation the wall 11 of the receptacle is compressed more extensively at vertical spaced intervals such as at the points 13, 14 and 15, such downward capillary movement of absorbed moisture will be very materially retarded. In other words, the walls of preferred moisture retaining receptacles are formed as is shown in Fig. 2 wherein the wall 11 is seen to be of varying thickness. The thin compressed portions of the wall 11 are indicated at 13, 14 and 15 whereas the thicker and more porous portions are indicated at 16 and 17.

The walls 11 of the receptacle are preferably compressed during the molding operation, thereby forming the compressed zones 13, 14 and 15, these zones extending in substantially horizontal planes spaced from each other and separated by the uncompressed, more porous portions 16 and 17.

It has been found that if a flower pot or other receptacle of uniform wall thickness is first molded and the wall thickness then reduced at spaced points, the result is not as satisfactory. If the wall thickness is reduced as by cutting away portions of the original clay wall, the final receptacle has a lower moisture retaining characteristic than a receptacle whose walls are of uniform thickness. If, however, the wall 11 of the receptacle is caused to assume a varying thickness by actually molding or compressing the plastic clay during the molding operation, then zones of maximum density are thus established separated by the more porous zones.

A moisture retaining receptacle made in accordance with the method described hereinabove has been found to absorb moisture and retain such moisture for materially longer periods of time, thus rendering such retained moisture available for the purpose of maintaining the contents of the receptacle in a cool and moist condition. Apparently large quantities of water are absorbed in the uncompressed zones such as the zones 16 and 17 and moisture absorbed in such zones is retained therein, the tendency for the moisture to feed downwardly through the capillaries of the wall being greatly reduced because of the interposed compressed and more dense partitions or zones existing at the compressed portions 13, 14 and 15.

It is to be understood that the method described hereinabove need not necessarily be employed only in the wall 11 of a receptacle. A similar mode of operation may be applied to the rim 10. No appreciable advantage, however, is to be gained by producing the alternate zones of denser and more porous body material in the base 12.

All such changes and modifications as come within the scope of the appended claims are embraced thereby.

I claim:

1. In a method of making ceramic containers and receptacles from plastic clay compositions, the steps of compressing the plastic material at vertically spaced substantially horizontal zones during the molding of walls of receptacles to form relatively dense wall portions spaced by relatively porous wall portions.

2. In a method of making ceramic containers and receptacles from plastic clay compositions, the steps of compressing the plastic material at vertically spaced substantially horizontal zones during the molding of walls of receptacles to form relatively dense wall portions spaced by relatively porous wall portions, said relatively porous wall portions being subjected to lower pressure during said molding than said compressed portions, and then drying and burning the molded receptacles.

WATSON E. BOCKMON.